Nov. 1, 1960     J. ULDERUP ET AL     2,958,526
ELASTIC MOUNT
Filed June 24, 1957
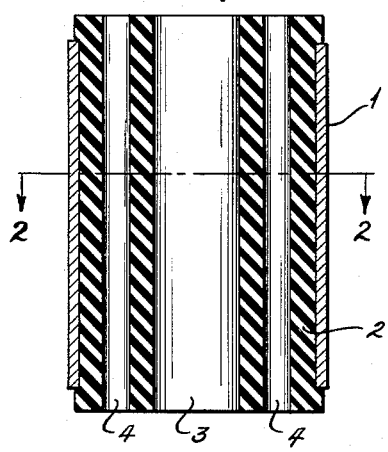
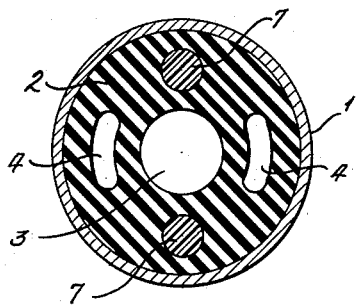
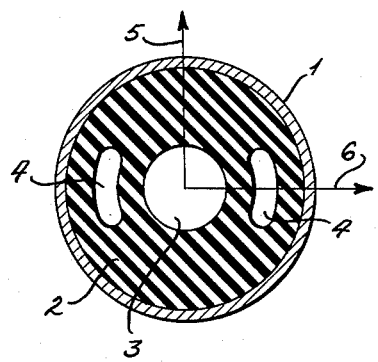
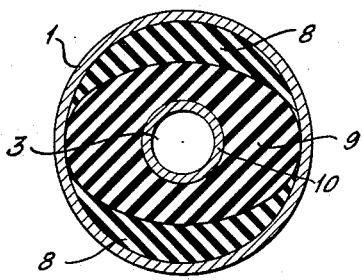
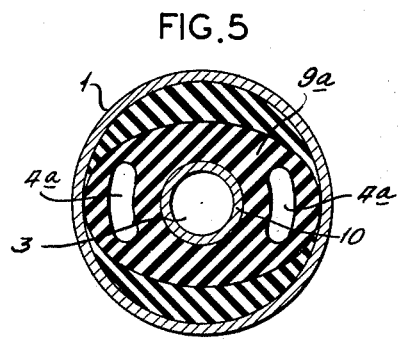
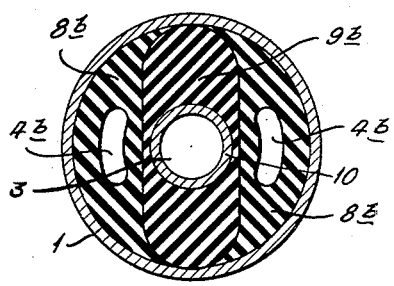

United States Patent Office 2,958,526
Patented Nov. 1, 1960

2,958,526

ELASTIC MOUNT

Jürgen Ulderup and Franz Gottfried Reuter, Lemforde, Hannover, Germany, assignors, by mesne assignments, to Mobay Chemical Company, Pittsburgh, Pa., a corporation of Delaware Filed June 24, 1957, Ser. No. 667,444

Claims priority, application Germany June 28, 1956

5 Claims. (Cl. 267—63)

This invention relates generally to elastic mounts and more particularly to improved mounts which can be used for supporting leaf springs, engines of motor vehicles and other objects where an elastic connection is required.

It is well known to use elastic mounts for the springs and engines of motor vehicles which mounts comprise an outer metal cylinder, an inner metal cylinder centrally arranged in said outer metal cylinder and a rubber pad between said outer and said inner cylinders.

Such mounts absorb the shock at the points where the springs of the vehicle are supported, reduce wear and tear of the chassis and eliminate rattling and squeaking. The dimensions of such elastic mounts must be so chosen that the rubber pad is not subjected to an excessive load since otherwise the rubber pad would be destroyed in a short time. For this reason the conventional mounts are relatively large. However, even in mounts of sufficiently large dimensions the rubber pad wears itself out and must be replaced from time to time. Another disadvantage of the conventional mounts of this kind resides in the fact that rubber is not stable to oils and greases, which often results in a premature deterioration of the mounts.

It is, therefore, an object of this invention to provide an elastic mount which is smaller in size than the heretofore used elastic mounts. Another object of the invention is to provide an elastic mount which has an increased service life. A further object of the invention is to provide an elastic mount that does not deteriorate under the influence of oils and greases used for lubrication. Still further objects will become apparent from the following description with reference to the accompanying diagrammatical drawing in which Figure 1 is a longitudinal sectional view of an elastic mount representing one embodiment of this invention;

Figure 2 is a cross sectional view taken on line II—II of Figure 1; and

Figures 3, 4, 5 and 6 are cross sectional views illustrating other embodiments of the invention.

In accordance with this invention, generally speaking, the foregoing objects and others are accomplished by providing elastic mounts comprising an outer metal cylinder, an inner metal cylinder coaxially disposed in said outer metal cylinder and an elastic pad or bushing of polyurethane rubber tightly fitted into the space between said outer and said inner metal cylinders, said elastic pad of polyurethane rubber having different spring constants in different directions. That is, the elasticity of the pad in one transverse direction differs from the elasticity in another transverse direction.

Due to the fact that the elastic pad contained in the mounts of the invention has different spring characteristics depending upon the direction of the forces acting on the mount, the mounts of the invention are capable of supporting greater loads than the heretofore used mounts of comparable dimensions. Another advantage resulting from the particular design of the mounts of the invention is that they can be made in relatively small sizes and yet withstand high loads. Moreover the polyurethane plastics forming the pads of the mounts of the invention are resistant to various types of mineral oils used in conventional lubricants for machine parts. Finally the elastic pads contained in the mounts of the invention need not be under a considerable tension as is the case with the rubber pads of the conventional mounts and, as a result, the mounts of the invention may have a stabilizing effect or may be soft and yielding depending upon the direction of the force acting upon them.

In order to produce a polyurethane rubber pad having different spring constants in different directions, various methods can be utilized. One mode of making a polyurethane rubber pad having different elastic characteristics in different directions involves combining a comparatively hard polyurethane rubber with a comparatively soft polyurethane rubber. Thus the elastic pad may be made up of (1) a polyurethane rubber having a hardness of about 90° Shore and a spring constant of about 5,000 kg. cm. and (2) a polyurethane rubber having a Shore hardness of about 60° and a spring constant of about 1500 kg. cm. Another method of producing a polyurethane rubber pad having different spring constants in different directions consists in providing a pad of polyurethane rubber with air chambers. It is also possible to make use of both methods by producing a pad from two polyurethane rubbers of different hardness and providing this composite pad with air chambers. Furthermore the present invention contemplates elastic mounts having polyurethane rubber pads with cavities, some of these cavities being filled with air and others being filled with a polyurethane material which is harder or softer than the polyurethane rubber forming the pad.

Referring more specifically to the above-mentioned embodiment of the mounts of the invention wherein two polyurethane rubbers of different hardness form the elastic pad, it may be advantageous to use a combination of a polyurethane rubber of circular cross section with a different polyurethane rubber of ellipsoid cross section. Mounts containing such a pad are particularly well suited for spring suspensions where the transverse forces coming into play are relatively constant and require a mount being soft and elastic in one direction and being relatively hard and unyielding in the direction which is perpendicular to the first direction. The spring characteristics of such a composite pad can be varied by providing either the cylindrical or the ellipsoid part with air chambers.

The elastic mounts of the invention may be subjected to transverse forces and to torsional forces. In the latter case, there may be obtained spring characteristics that are very similar to those of a torsion spring.

Referring more particularly to the drawings, the elastic mount illustrated in Figures 1 and 2 comprises the outer metal cylinder 1, the elastic pad 2 consisting of polyurethane rubber and having a central bore into which an inner metal cylinder such as the pin of a leaf spring can be inserted. The pad 2 contains the kidney-shaped air chambers 4. Due to its design the elastic mount shown in Figures 1 and 2 has a higher spring constant in the direction of arrow 5 than in the direction of arrow 6. Likewise, the spring diagram obtained by plotting a curve of force (load) versus deflection will be steeper in the direction of arrow 5 than in the direction of arrow 6.

The mount illustrated in Figure 3 comprises the pad 2 having chambers filled with air and chambers filled with the polyurethane plastic 7 of different hardness. This polyurethane plastic 7 may be harder or softer than the polyurethane plastic forming the pad 2.

Figure 4 diagrammatically represents a mount having a pad made up of the polyurethane rubbers 8 and 9. Polyurethane rubber 8 has a circular cross section while polyurethane rubber 9, which is of different hardness, has an ellipsoid cross section. The bore 3 is designed to accommodate the inner metal cylinder 10. Depending upon the difference in hardness between the polyurethane rubbers 8 and 9, the difference in the spring constants in different directions with respect to the mount will be smaller or greater.

The embodiment shown in Figure 5 differs from the mount illustrated in Figure 4 by having the kidney-shaped air chambers 4a in the polyurethane rubber 9a of ellipsoid cross section.

According to Figure 6 the non-cylindrical part 9b of the pad has a somewhat different shape than the corresponding parts of the embodiments shown in Figures 4 and 5. Moreover the cylindrical part 8b contains the air chambers 4b.

In all embodiments shown in the drawings the central bore accommodates the inner metal cylinder of the mount. This inner metal cylinder may be a metal tube containing the pin of a leaf spring or a bolt. The inner metal cylinder may be somewhat slideable in the pad or it may adhere to the pad firmly. In the latter case the elastic mounts of the invention can be subjected to torsion and act as torsion springs.

The polyurethane rubber serving as construction material for the pads of the mounts according to the invention is made by methods which are known per se. Methods for producing polyurethane rubber are described in the literature, for example, in United States Patents 2,620,516; 2,621,166; 2,729,618; and 2,778,810, the disclosure of which is incorporated herein by reference.

Polyurethane rubber of the most various hardness may be used to form the elastic pads of the mounts of the invention, but particularly good results are obtained if the spring constant of the polyurethane rubber utilized ranges from about 500 to 6,000 kg. cm., as determined in the Rörlig oscillator at a frequency of $16\frac{2}{3}$ Hertz.

Polyurethane rubbers of different spring constants are obtained by varying the formulation used for their preparation. The following examples show the preparation of polyurethane rubbers of different spring constants but it is to be understood that other conventional formulations can be employed to produce polyurethane rubbers of the same or different spring characteristics.

*Example I*

Production of a hard polyurethane rubber—1000 parts of a glycol adipic acid polyester of the OH-value 50 (corresponding to 1.5 percent OH) are dehydrated in a stirring vessel at a temperature of 130° C. and under a pressure of 12 mm. The polyester is free from water as soon as formation of bubbles has stopped. While stirring 300 parts of 1,5-naphthylene diisocyanate are added at 130° C., whereby a slight rise in the temperature is caused. As soon as the temperature drops 70 parts of butylene glycol-1,4 are added at 130° C. and upon stirring shortly the mixture is cast into a mold, the walls of which have been coated with a mold release agent, such as floor wax. The mold is heated at 100–110° C. for a period of 48 hours. The hard polyurethane rubber thus obtained has a hardness of 90° Shore and a spring constant of 5,000 kg. cm. as determined in the Rörlig oscillator at a frequency of $16\frac{2}{3}$ Hertz.

*Example II*

Production of a soft polyurethane rubber—1000 parts of a glycol adipic acid polyester of the OH-value 50 (corresponding to 1.5 percent OH) are dehydrated in a stirring vessel at a temperature of 130° C. and under a pressure of 12 mm. The polyester is free from water as soon as formation of bubbles has stopped. While stirring 180 parts of 1,5-naphthylene diisocyanate are added at 130° C., whereby a slight rise in the temperature is caused. As soon as the temperature drops 20 parts of a polyol mixture consisting of 60% by weight of butylene glycol-1,4 and 40% by weight of trimethylol propane are added at 130° C. and upon stirring shortly the mixture is cast into a mold, the walls of which have been coated with a mold release agent such as floor wax. The mold is heated at 100–110° C. for a period of 48 hours. Thus there is obtained a soft polyurethane rubber having a hardness of 60° Shore and a spring constant of 1500 kg. cm. as determined in the Rörlig oscillator at a frequency of $16\frac{2}{3}$ Hertz.

*Example III*

Production of a polyurethane sponge—1000 parts of a glycol adipic acid polyester of the OH-value 50 (corresponding to 1.5 percent OH) are dehydrated in a stirring vessel at a temperature of 130° C. and under a pressure of 12 mm. The polyester is free from water as soon as formation of bubbles has stopped. While stirring 200 parts of 1,5-naphthylene diisocyanate are added at 130° C., whereby a slight rise in temperature is caused. As soon as the temperature drops there are added while stirring at first 20 parts of 1,4-butylene glycol and one minute later 6 parts of water. The mixture thus obtained is poured into a mold, the walls of which have been coated with a mold release agent, such as floor wax. Thus there is formed a polyurethane rubber sponge having a spring constant of 800 kg. cm. as determined in the Rörlig oscillator at a frequency of $16\frac{2}{3}$ Hertz.

Although the invention has been described in detail in the foregoing for the purpose of illustration, it is to be understood that such detail is solely for the purpose of illustration and that variations can be made in the various embodiments by those skilled in the art without departing from the scope or spirit of the invention except as is set forth in the claims.

In making the elastic pads of the mounts according to the present invention it is desirable to see to it that the difference between the spring constant in one direction and the spring constant in a direction perpendicular to the first direction is at least 500 kg. cm.

What is claimed is:

1. An elastic mount for a vehicle spring suspension system comprising an outer metal cylinder and a cylindrical elastic pad of polyurethane rubber snugly fitted therein, said elastic pad having a centrally disposed bore therein adapted to receive a spring shackle bolt, said elastic pad comprising three parts, two of said parts having a substantially crescent shaped cross-section and a third part of substantially elliptical cross-section positioned therebetween and being in contact with said outer metal cylinder.

2. An elastic mount for a vehicle suspension system comprising an outer metal cylinder, an inner metal cylinder coaxially disposed in said outer metal cylinder, and a cylindrical elastic pad of polyurethane rubber tightly fitted therebetween, said elastic pad comprising three parts, two of said parts having a substantially crescent shaped cross-section and a third part of substantially elliptical cross-section positioned therebetween and being in contact with said metal cylinder, said mount having a spring constant in one direction at least 500 kg.-cm. greater than in a second direction perpendicular to said first direction.

3. An elastic mount as defined in claim 2 wherein said parts of polyurethane rubber differ in hardness and spring constants.

4. An elastic mount as defined in claim 2 wherein at least one of said parts forming said elastic pad contains substantially concentrically disposed kidney-shaped chambers.

5. An elastic mount for a vehicle spring suspension system comprising an outer metal cylinder and a cylindrical elastic pad of polyurethane rubber snugly fitted therein, said elastic pad having a centrally disposed bore therethrough adapted to receive a spring shackle bolt, said elastic pad having diametrically opposed chambers filled with a polyurethane plastic of different hardness from that of said pad and diametrically opposed air chambers which lie on a diameter transverse to the diameter intersecting said polyurethane filled chambers.

References Cited in the file of this patent

UNITED STATES PATENTS

| | | |
|---|---|---|
| 2,043,015 | Shutts | June 2, 1936 |
| 2,061,767 | Hobson | Nov. 24, 1936 |
| 2,363,469 | Goldschmidt | Nov. 21, 1944 |
| 2,367,033 | Lear | Jan. 9, 1945 |
| 2,620,516 | Muller | Dec. 9, 1952 |

FOREIGN PATENTS

| | | |
|---|---|---|
| 428,419 | Italy | Dec. 16, 1947 |